United States Patent [19]

Swank et al.

[11] Patent Number: 4,806,042

[45] Date of Patent: Feb. 21, 1989

[54] QUICK-DISCONNECT RIGID COUPLING

[75] Inventors: David T. Swank, Millersburg; Edrick H. Eater, Mansfield, both of Ohio; Len A. Daniel, Lake Orion, Mich.

[73] Assignee: The Fluorocarbon Company, Aurora, Ohio

[21] Appl. No.: 122,750

[22] Filed: Nov. 19, 1987

[51] Int. Cl.⁴ .............................................. F16D 1/00
[52] U.S. Cl. .................................. 403/341; 403/286; 403/101; 403/102
[58] Field of Search ............... 403/100, 101, 102, 341, 403/378, 379, 286

[56] References Cited

U.S. PATENT DOCUMENTS

| 2,363,520 | 11/1944 | Fish | 403/379 X |
|---|---|---|---|
| 2,895,757 | 7/1959 | Kasper | 403/100 |
| 4,626,126 | 12/1986 | Suchder et al. | 403/353 |

FOREIGN PATENT DOCUMENTS 1072016  12/1959  Fed. Rep. of Germany ...... 403/157

OTHER PUBLICATIONS

Photocopies of a catalog of American Fibora-Springfix.

Primary Examiner—Andrew V. Kundrat
Attorney, Agent, or Firm—Knobbe, Martens, Olson & Bear

[57] ABSTRACT

A quick-disconnect coupling used to connect two members of a linkage in such a manner as to form a rigid coupling capable of transmitting push, pull or rotational forces, and allow quick and easy manual disconnection without longitudinal or rotational movement of either member or loosening of components which would affect linkage adjustment. An eye and clevis are provided with two holes therethrough. In each hole is a placed a spring pin connector comprising a pin for insertion into the hole, a snap for attachment to the body of either the clevis or eye, and a strap connecting the snap and pin.

4 Claims, 1 Drawing Sheet

QUICK-DISCONNECT RIGID COUPLING

BACKGROUND OF THE INVENTION

This invention relates to a quick-disconnect coupling arrangement for connecting two members of a linkage between which respective longitudinal, lateral and rotational movement is to be prevented. The prior art recognizes that, where linkage members are attached to a structure, it may be inconvenient or impossible to disconnect the linkage from that structure when removal of that structure is necessary or otherwise. In such a case, it is preferable to use two linkage members rigidly but releasably connected so as to prevent lateral or rotational movement therebetween. The most common form of such a linkage is two bars with respective left and right-hand threads and a connecting turnbuckle. Turnbuckles enjoy the significant advantage that their installation, removal and adjustment requires no special tools. The turnbuckle has its disadvantages, however, in certain applications. In order to loosen and remove a turnbuckle coupling, the turnbuckle must be unscrewed, which forces the right and left-hand threaded end portions of the respective linkage members apart longitudinally. This operational characteristic renders turnbuckles inappropriate for use where longitudinal or rotational movement of the linkage members is not possible or where it is preferable to maintain longitudinal adjustment of the linkage members. An example is vehicles having a removable machine element such as a power package, transmission, or the like, with a linkage for attachment to another machine element, such as a shifter, throttle, clutch, or the like. Removal of the removable machine element requires its disconnection from the other machine element. Longitudinal and rotational movement of the linkage members and disconnection of the members from either machine element may be impossible. Disturbing the longitudinal adjustment of the linkage is likely to be inconvenient.

Use of clevis and eye connections including a connecting pin are commonly known in the prior art. A standard pin, clevis and eye arrangement prevents longitudinal movement between adjacent linkage members, but allows relative rotation of such members about the pin. Use of a clevis pin has certain recognized disadvantages, however. The pin must be maintained in position by means of a cotter pin, retaining ring, or the like. Cotter pins tend to break, fall off, or get lost. Moreover, their application and removal requires a pair of pliers. Likewise, installation and removal of retaining rings requires a special tool. The prior art has overcome the disadvantages associated with cotter pins and retaining rings by using spring pin connectors. These connectors include a pin for insertion through the eye and clevis holes, a snap for attaching the connector to a neck on the pin or clevis, and a strap connecting the pin and snap.

SUMMARY OF THE INVENTION

The present invention relates to a quick-disconnect coupling utilizing a two-pin eye and clevis and a pair of spring pin connectors. The quick-disconnect coupling of the present invention enjoys several significant advantages. Use of the clevis and eye arrangement allows disconnection distal from a machine element without longitudinal or rotational movement or loss of longitudinal adjustment of the linkage members. Use of the two pin arrangement prevents relative lateral and rotational movement between the two linkage members, allowing the members to transmit push, pull and rotational forces therebetween. The snap portion of the coupling connector enables the connector to be applied manually without special tools and prevents the connector from vibrating or otherwise coming loose. cl BRIEF DESCRIPTION OF THE DRAWINGS FIG. 1 is an exploded perspective view of a quick-disconnect coupling constructed in accordance with the present invention FIG. 2 is a plan view of the coupling, two linkage members and two machine elements.

DETAILED DESCRIPTION OF A PREFERRED EMBODIMENT

Figures 1, 2:
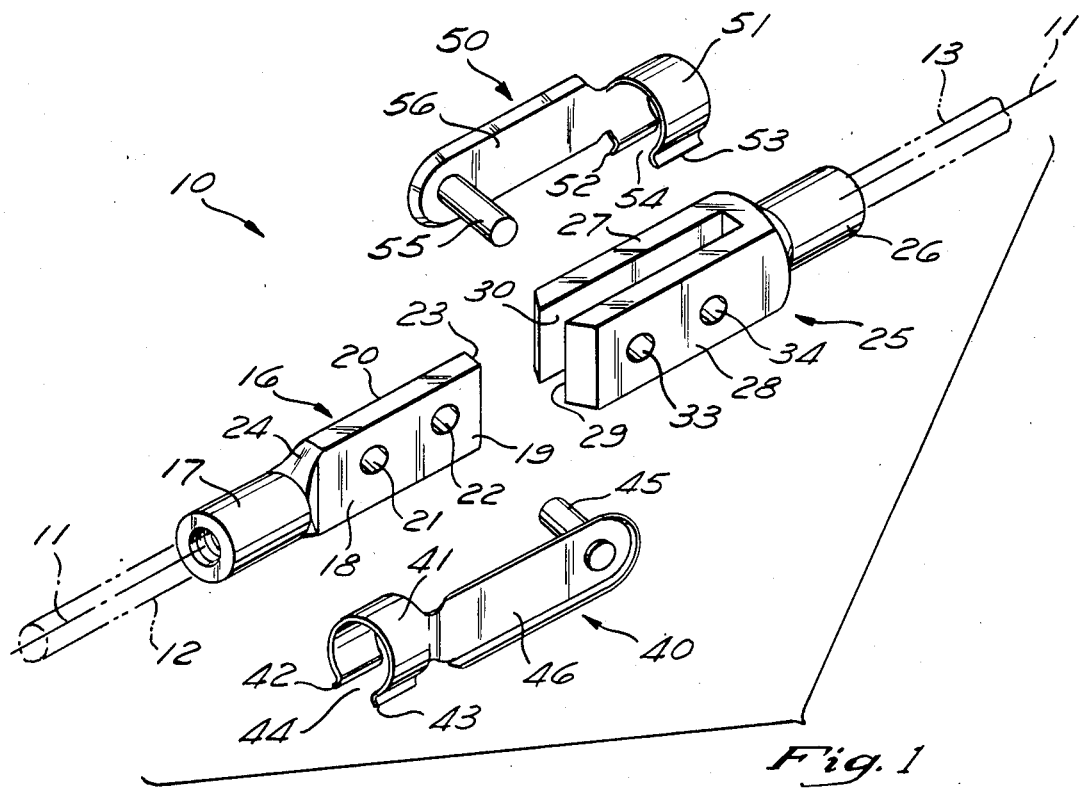

Referring to FIGS. 1 and 2, a quick-disconnect coupling 10 of the present invention is shown. The coupling is arranged around a central axis 11 and, as shown in FIG. 2, connects two linkage members 12, 13, which are attached to machine elements 14, 15, respectively. The machine elements 14, 15 could be a power package transmission, throttle, shift, clutch or the like. It will be appreciated by one of ordinary skill in the art that either or both linkage members 12, 13 could be attached to another linkage member instead of a machine element. Linkage member 12 either has its end formed into, or has attached thereto, an eye member 16, including a neck 17 preferably having a generally cylindrical surface. Extending axially from the neck 17 is a tongue 18. The tongue 18 has two planar substantially parallel sides 19, 20 laterally spaced from the coupling central axis 11. Communicating between the two sides 19, 20 are two spaced holes 21, 22 substantially perpendicular to and intersecting the coupling central axis 11 and spaced between the tongue end 23 and the intersection 24 of the neck 17 and the tongue 18. It will be appreciated by one of ordinary skill in the art that a separate eye member need not be fabricated to employ the subject invention. The subject invention may be utilized on a linkage member forming a bar with spaced parallel planar sides by forming two spaced holes directly into the linkage member.

Linkage member 13 either has its end formed into, or has attached thereto, a clevis member 25. The clevis member 25 has a neck 26, preferably substantially cylindrical in shape, arranged around coupling central axis 11. Attached to and extending from the clevis neck 26 are two parallel spaced legs 27, 28 having interior flat planar parallel surfaces 29, 30 spaced substantially equidistant from the central axis 11. The clevis leg interior surfaces 29, 30 are separated by a distance greater than the width of the eye member tongue 18, that is, greater than the distance between sides 19, 20, so that the eye member tongue 18 may be inserted between the clevis member legs 27, 28 without interference.

Extending through the top clevis leg 27 are two spaced holes 31, 32 substantially perpendicular to and directed toward the central axis 11. Formed in the bottom clevis leg 28 are two spaced holes 33, 34. Bottom clevis leg hole 33 is coaxial with top clevis leg hole 31. Likewise, bottom clevis leg hole 34 is coaxial with top clevis leg hole 32.

Shown in FIG. 2 attached to the neck 17 of eye member 16 and fixing eye member leg hole 22 in a coaxial relationship with clevis member leg holes 32, 34 is first connector 40. As shown in FIG. 1, first connector 40 consists of a snap portion 41 formed of a strip of material, preferably steel, in a plane perpendicular to the central axis 11 and formed in a substantially semicircular fashion thereabout. The interior diameter of snap 41 is approximately equal to the diameter of eye member neck 17. The ends 42, 43 of the snap are preferably flared out from the semicircle forming an open area 44 therebetween. The first connector 40 also includes a pin 45, which is preferably cylindrical and is oriented perpendicular to and intersects the central axis 11. The pin 45 has a diameter slightly smaller than the diameter of the clevis leg holes 31-34 and the eye member tongue holes 21, 22, preferably forming a loose running fit therewith. Attached to and connecting the pin and snap portions of the first connector 40 is a strap 46.

The final member of the coupling is a second connector 50, similar, if not identical, to the first connector 40. The snap 51 of the second connector 50 is a strip of material arranged in a semicircular fashion with an inside diameter approximately equal to the outside diameter of the clevis member neck 26. As in the first connector, the ends 52, 53 of the second connector snap are preferably flared outwardly from the semicircle forming an open area 54 therebetween. The second connector pin 55 is also preferably cylindrical and is oriented perpendicular to and intersects the central axis 11. The outside diameter of pin 55 is slightly smaller than the diameter of clevis member leg holes 31, 33 and eye member tongue hole 21, preferably forming a loose running fit therewith. The second connector snap 51 is attached to the second connector pin 55 by means of a strap 56.

The connectors 40, 50 are commercially available, for example, from American Fibora/Springfix. The pins 45, 55 are preferably steel and the straps 46, 56 and snaps 41, 51 are preferably made of spring steel. Preferably, the straps 46, 56 are relatively rigid.

To connect the quick-disconnect coupling 10 of the present invention, the eye member 16 and clevis member 25 are aligned in a coaxial fashion by bringing them together until eye tongue holes 21, 22 are aligned with clevis member leg holes 31-34. Once the clevis 25 and eye 16 are aligned, the first connector 40 is applied by aligning the first connector pin 45 with the bottom clevis leg hole 34, eye member tongue hole 22 and top clevis leg hole 32. The first connector strap 46 is oriented at an acute angle with the central axis 11 so that the open area 44 of the snap faces the eye member neck 17. To attach the first connector 40, the pin 45 is manually pressed through holes 34, 22 and 32. Once the pin 45 is inserted, the strap 46 and snap 41 are rotated about the pin until the snap 41 is pressed snugly against the eye member neck 17. Urging the open area 44 of the snap 41 against the eye member neck 17 causes the ends 42, 43 of the snap to be forced apart laterally, thereby further opening the open end 44 of the snap 41 until the snap ends 42, 43 pass over the outer-most points on the eye member neck 17. Once the snap ends 42, 43 are pushed over those points, the spring action of the distorted snap returning to its released state causes the snap 41 to clasp the eye member neck 17 in a locking relation. Connection of the first connector 40 to the eye member 16 and clevis member 25 restricts the respective members 16 and 25 from longitudinal movement with respect to each other, but does not preclude relative rotation between members about a central axis defined by the first connector pin 45.

In order to prevent relative rotation between members 16 and 25, the second connector 50 is attached. The second connector 50 is attached in a fashion similar to the first connector 40. The second connector pin 55 is aligned with top clevis leg hole 31, eye member tongue hole 21 and bottom clevis leg hole 33. The second connector strap 56 is oriented at an acute angle with the central axis 11 so that the open area 54 of snap 51 faces the clevis neck 26. The second connector pin 55 is then pushed manually through holes 31, 21, 33. Then the second connector snap 51 is urged against and into a locking relationship with clevis neck 26. Attachment of the first and second connectors prevents any relative movement of the eye member 16 and clevis member 25.

In order to disconnect the coupling 10, the connectors 40, 50 are removed and the eye member 16 and clevis member 25 are thereby freed for relative movement. In order to remove the connector 40, the snap 41 is pulled out of engagement with the eye member neck 17 by grasping the strap 46 proximate the snap 41 and pulling the snap away from the eye member neck 17. Once the snap is removed, the pin 45 may be easily withdrawn from the clevis leg holes 32, 34 and the eye member tongue hole 22. The connector 50 may be removed by following the same procedure. It will be appreciated that removal of the two spring pin connectors 40, 50 will not disturb the longitudinal adjustment of the linkage members and does not require longitudinal or rotational movement of the linkage members 12, 13. Nor will their removal require disconnection proximate either machine element 14, 15.

This invention is not to be limited by the embodiment shown in the drawings and described in the description, which are given by way of example and not of limitation, but only in accordance with the scope of the appended claims.

What is claimed is:

1. An apparatus, comprising:
   an eye having first and second spaced parallel holes therethrough;
   a clevis having third and fourth spaced parallel holes therethrough, said third and fourth holes being spaced a distance equal to the distance between said first and second holes;
   first connection means for insertion through said first and third holes and attachment to said clevis in a locking relation; and
   second connection means for insertion through said second and fourth holes and attachment to said eye in a locking relation.

2. The apparatus of claim 1, further comprising:
   a first machine element;
   a first linkage member connecting said first machine element to said eye;
   a second machine element; and
   a second linkage member connecting said second machine element to said clevis, whereby connection of said first and second connection means to said eye and clevis establishes a rigid coupling capable of transmitting push, pull and rotational forces between said first machine element and linkage member and said second machine element and linkage member, and disconnection of said first and second connection means frees said first machine element and linkage member from said second machine element and linkage member without longitudinal movement of said first and second linkage members.

3. A quick-disconnect rigid coupling, comprising:

an eye arranged about a central axis and having first and second parallel holes therethrough perpendicular to and intersecting said central axis;

a clevis arranged about said central axis having a generally cylindrical neck, spaced parallel upper and lower legs longitudinally protruding therefrom, said upper leg having third and fourth spaced parallel holes therethrough and said lower leg having fifth and sixth spaced parallel holes therethrough, said third hole being coaxial with said fifth hole, said fourth hole being coaxial with said sixth hole, and said third and fourth holes and said fifth and sixth holes being spaced a distance equal to the distance between said first and second holes;

a cylindrical pin for insertion through said third, first and fifth holes having attached thereto a semicircular strip for engaging said clevis in locking relation; and a cylindrical pin for insertion through said fourth, second and sixth holes having attached thereto a semicircular strip for engaging the neck of said eye member in locking relation.

4. A coupling for connecting members of a linkage, eliminating relative movement therebetween, and allowing easy and quick manual connection and disconnection without tools and without longitudinal or rotational movement of the linkage members, comprising:

an eye member arranged about a central axis having a generally cylindrical neck and a tongue longitudinally protruding therefrom with parallel planar top and bottom surfaces spaced equidistant from said central axis and first and second spaced parallel holes therethrough, perpendicular to and intersecting said central axis;

a clevis arranged about said central axis having a generally cylindrical neck, an upper leg longitudinally protruding therefrom having an upper planar clevis surface, a lower leg longitudinally protruding therefrom parallel to said upper leg having a lower planar clevis surface, said upper and lower clevis surfaces being separated by a distance slightly greater than that between said top and bottom eye surfaces, said upper and lower legs having provided therethrough first and second spaced parallel holes separated by a distance equal to that between the eye member tongue holes;

a first connector having (a) a first cylindrical pin for insertion through said first upper leg hole, said first tongue hole and said first lower leg hole, (b) a strap attached to said first pin, and (c) a generally semicircular strip attached to said strap for engaging said clevis neck in a locking relation; and a second connector having (d) a second cylindrical pin for insertion through said second upper leg hole, said second eye hole and said second lower leg hole, (e) a strap attached to said second pin, and (f) a generally semicircular strip attached to said strap for engaging said eye member neck in a locking relation.

* * * * *